United States Patent [19]
Gruett

[11] Patent Number: 5,323,653
[45] Date of Patent: Jun. 28, 1994

[54] FLUID LEVEL DETECTION APPARATUS

[75] Inventor: Donald G. Gruett, Manitowoc, Wis.

[73] Assignee: Oil-Rite Corporation, Manitowoc, Wis.

[21] Appl. No.: 27,959

[22] Filed: Mar. 8, 1993

[51] Int. Cl.⁵ .............................................. G01F 23/02
[52] U.S. Cl. .................................... 73/326; 73/292; 73/330; 73/325
[58] Field of Search ................. 73/292, 325, 326, 328, 73/330; 374/142

[56] References Cited

U.S. PATENT DOCUMENTS

| | | | |
|---|---|---|---|
| 986,199 | 3/1911 | Moser | 73/326 |
| 1,164,484 | 12/1915 | Ernst | 73/328 |
| 1,406,926 | 2/1922 | Bryan | 73/330 |
| 3,212,334 | 10/1965 | Conlon | 73/326 |
| 3,292,434 | 12/1966 | McDaniel | 73/330 |
| 3,455,163 | 7/1969 | Lukas et al. | 73/328 |
| 3,540,276 | 11/1970 | Lyden | 73/328 |
| 3,835,708 | 9/1974 | Gruett | 73/292 |
| 3,886,796 | 6/1975 | Gruett | 73/328 |
| 4,050,305 | 9/1977 | Evans et al. | 73/326 |
| 4,345,468 | 8/1982 | Jackson | 73/326 |

FOREIGN PATENT DOCUMENTS

1133798  11/1968  United Kingdom ............ 73/292

*Primary Examiner*—Diego F. F. Gutierrez
*Attorney, Agent, or Firm*—Godfrey & Kahn

[57] ABSTRACT

A fluid level detection apparatus including a support member; first and second end blocks which are slidably engageable with the support member and which each have a passageway; a seal borne by each of the end blocks and disposed in each of the passageways, and a transparent tube telescopingly received in the respective passageways, and defining a fluid passageway or chamber; the present invention disposed in fluid flowing relation relative to an object of interest.

14 Claims, 9 Drawing Sheets

FLUID LEVEL DETECTION APPARATUS

BACKGROUND OF THE INVENTION

1. Field of the Invention

The present invention relates generally to a fluid level detection apparatus which is operable to measure the amount of fluid present in an object of interest, such as a tank, machine, or other article of manufacture, and more specifically, to an apparatus which may be manufactured or otherwise fabricated as a kit, and which can be assembled at a remote location for use on particular machines or in manufacturing processes.

2. Description of the Prior Art

The prior art is replete with numerous examples of prior art fluid level detecting apparatuses which are operable to provide a means whereby an operator may visually detect or otherwise verify the fluid levels in an object of interest, such as manufacturing machinery; fluid holding tanks; or other similar assemblies. For example, in certain industrial processes, it is important that particular fluids, such as lubricants, hydraulic fluids, or other fluid components of a manufacturing process be retained in tanks which are disposed in fluid flowing relation relative to a device utilizing same, or other manufacturing process. Such fluid level detecting devices have in the past typically included a transparent tube which is connected in fluid flowing relation relative to the fluid holding tank, and which further is oriented in a fashion which provides a quick and convenient means by which an operator may visually verify the level of the fluid present.

While the prior art devices have operated with some degree of success, they have been unsatisfactory in several important respects. For example, and in some industrial applications, the fluid level detecting devices must have an exceeding long length dimension due to the size of the tanks involved. Further, and in view of the fluids held in the tank, only certain materials could be utilized in the fabrication of the transparent tube. For example, if the materials were exceeding acidic, or otherwise had undesirable characteristics, glass tubes were frequently employed as opposed to utilizing synthetic, polymeric-based materials. As would be expected, as the tube length increases, the likelihood that such tubes could conceivably be damaged or rendered totally inoperable by accident, or otherwise, increase significantly. Therefore, in order to utilize such long transparent tubes, these same tubes are frequently encased in hardened protective shells or channels, thereby providing an increased level of protection.

It should be understood that these protective measures such as providing hardened shells, guards and other similar assemblies significantly increases the cost of these prior art assemblies. Furthermore, to sealingly secure the tube with the source of fluid to be measured, manufacturers have often utilized compression seals which are disposed endwardly of the transparent tube and which are held in place thereafter by a support assembly which presses or otherwise holds the respective seals against the end of the tube. While this method of sealing has operated with some degree of success, it is less than ideal because the force exerted by the support assembly is directed substantially along the longitudinal axis of the tube. In those instances where the tube is manufactured from glass, this method of sealing the tube is unsatisfactory inasmuch as the force may cause the tube to distort over time.

In addition to the foregoing, many of the prior art devices, which are illustrated in the drawings are cumbersome and otherwise complex in their overall design, thereby rendering them expensive, relatively speaking, to manufacture and maintain. Additionally, the prior art is devoid of a fluid level detection apparatus which provides various alternative means for measuring the temperature of the fluid being monitored, and which further can be assembled at a remote location, or otherwise adapted onsite, to fit various machines, tanks, or other assemblies having diverse physical characteristics.

Therefore, it has long been known that it would be desirable to have a fluid level detection apparatus which is particularly well-suited for measuring the fluid level in an object of interest; which can be manufactured in an inexpensive, compact kit configuration; is operable to provide a means for accurately determining the fluid level in the object of interest; and which minimizes, to the extent possible, the deficiencies identified in the prior art.

SUMMARY OF THE INVENTION

Therefore, it is an object of the present invention to provide an improved fluid level detection apparatus.

Another object of the present invention is to provide a fluid level detection apparatus which can be fabricated as a kit, and which may be assembled at a remote location for use with a wide range of devices, and other objects of interest which must be monitored with respect to their fluid level.

Another object of the present invention is to provide a fluid level detection apparatus which can be manufactured to provide various options relative to measuring the temperature of the fluid being monitored.

Another object of the present invention is to provide a fluid level detection apparatus which may be fabricated in a fashion which provides a convenient means by which a fluid level detection apparatus may be assembled to a predetermined length, rapidly and conveniently.

Another object of the present invention is to provide a fluid level detection apparatus which may be assembled using sources of prefabricated materials.

Another object of the present invention is to provide a fluid level detection apparatus which includes a transparent tube which is sealingly secured in fluid flowing relation relative to an object of interest by utilizing seals which engage the exterior facing surface of the tube, as opposed to utilizing axially oriented compression-type seals.

Another object of the present invention is to provide a fluid level detection apparatus which is easy to assemble and place into operation, and which further is readily accessed for purposes of maintenance, modification and the like.

Another object of the present invention is to provide such an apparatus which is characterized by easy utilization, simplicity of construction, and which further can be manufactured, sold and maintained at a relatively nominal cost.

These and other objects and advantages are achieved in a fluid level detection apparatus which includes a support member having a rear wall and a pair of side walls which extend outwardly therefrom, and wherein the support member further has opposite first and second ends, and wherein the side walls and rear wall define a channel having predetermined length, width and height dimensions; a first end block having a main body which is dimensioned to be slidably received in the channel and positioned adjacent the first end of the support member, the first end block having a first passageway formed therein which has predetermined dimensions, and wherein a seal is borne by the first end block and positioned in the passageway; a second end block having a main body which is dimensioned to be slidably received in the channel and positioned adjacent the second end of the support member, the second end block having a second passageway formed therein, and wherein the second passageway has predetermined dimensions and is disposed in fluid flowing relation with a source of fluid, and wherein a seal is borne by the second end block and disposed in the second passageway; and a transparent tube defining a conduit and having opposite ends is slidably and telescopingly received in the first and second passageways, and wherein the respective seals engage the transparent tube thereby securing the tube in fluid flowing relation relative to the source of fluid.

DESCRIPTION OF THE PREFERRED EMBODIMENT

Figures 1, 9:
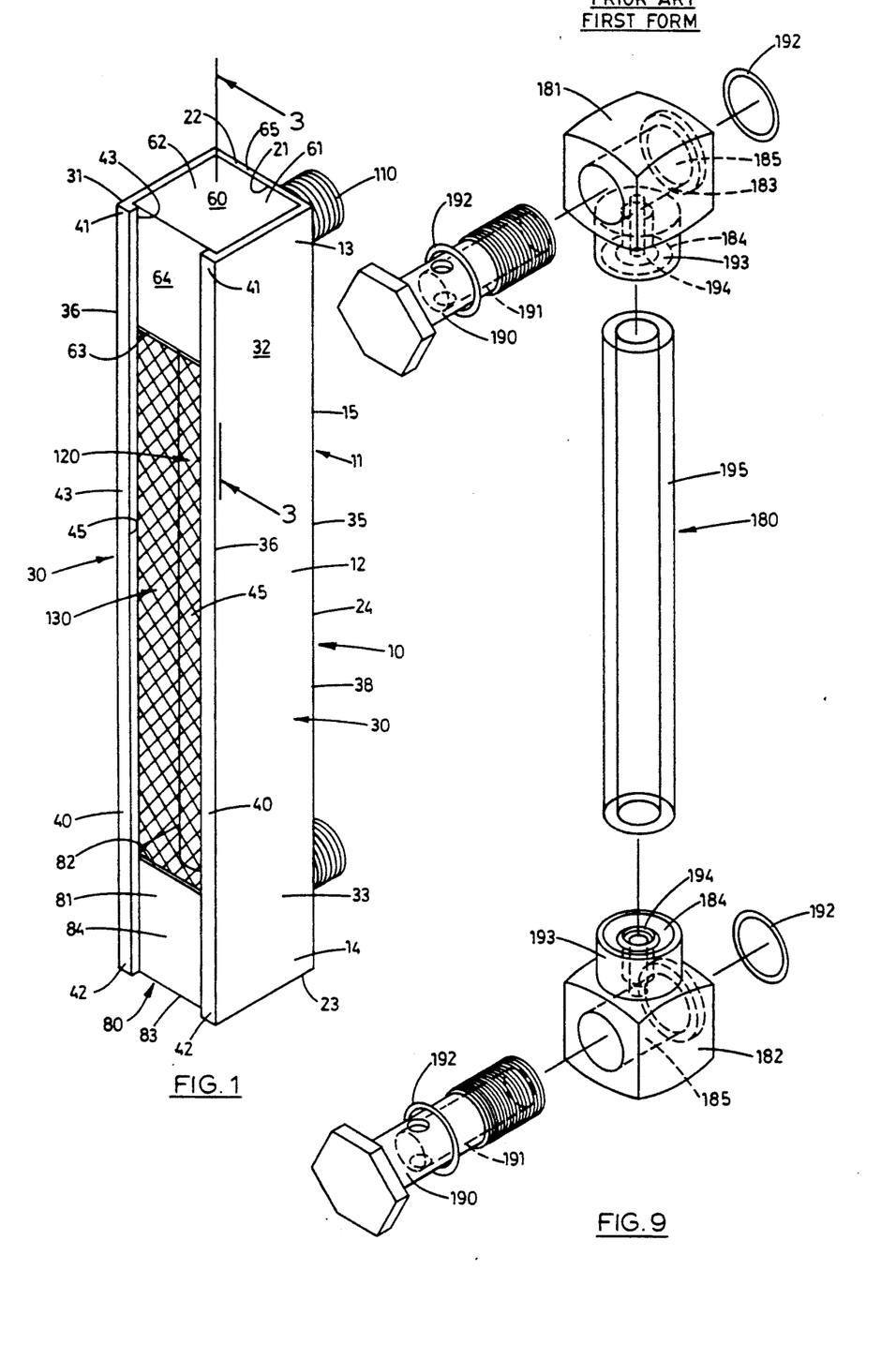
FIG. 1 is a perspective, environmental view of the fluid level detection apparatus of the present invention.
FIG. 9 is a perspective, exploded, environmental view of the prior art device shown in FIG. 7.

The fluid level detection apparatus of the present invention is generally indicated by the numeral 10 in FIG. 1. As shown therein, the apparatus is depicted as it would appear if it was connected in fluid flowing relation relative to an object of interest, such as a fluid holding tank, machine, or other device, not shown. As best seen in the exploded, perspective view of FIG. 2, the apparatus 10 includes a support member which is generally indicated by the numeral 11 and which has a main body 12. The main body has opposite first and second ends, 13 and 14, respectively. The main body 12 also includes a rear wall 15, which has an exterior facing surface 20, and an opposite interior facing surface 21. The rear wall further has opposite first and second ends, 22 and 23, respectively, and further defines longitudinally disposed peripheral edges 24. As best seen in FIG. 3, the rear wall is substantially planar in its overall configuration but it should be understood that other shapes may be appropriate in various operational environments or industrial applications. First and second apertures, 25 and 26, respectively, are formed in the first and second ends, 22 and 23 of the rear wall. The operation of the individual apertures will be discussed in greater detail, hereinafter.

The apparatus 10 of the present invention and more specifically, the support member 11, further includes a pair of side walls which are generally indicated by the numeral 30. The pair of side walls include a first, or left side wall 31, and a second, or right side wall 32. Each of the respective side walls have an exterior facing surface 33, and an opposite interior facing surface 34. Additionally, each wall has a lower peripheral edge 35 which is joined, or otherwise fixed on, or made integral with, the individual peripheral edges 24 of the rear wall 15; and further has an upper peripheral edge 36. As best illustrated by reference to FIG. 2, each side wall has a retaining lip which is generally indicated by the numeral 40. Each retaining lip has opposite first and second ends, 41 and 42; an interior facing surface facing 3; and an opposite, exterior facing surface 44. Further, each retaining lip has an inwardly disposed peripheral edge 45, and an outwardly disposed peripheral edge 46, which is joined to, mounted on, or otherwise made integral with the upper peripheral edge 36 of the first and second side walls, 31 and 32, respectively. The respective retaining lips are generally oriented in a substantial normal position relative to the first and second side walls and extend inwardly, one towards the other. It should be understood that the rear wall 15, and the left and right side walls 31 and 32, define a channel 50 having predetermined height, length and width dimensions. The support member may be formed by extrusion or other suitable manufacturing techniques. Except for cutting or forming the support member to a desired length, and forming the aperture 25 and 26, no other manufacturing steps are required to be taken on the support member.

The channel 50 is operable to slidably accommodate and secure, in a predetermined position, a first end block which is generally indicated by the numeral 60. The first end block has a main body 61, which has a first end 62; an opposite second end 63; a top surface 64; and an opposite, bottom surface 65. The first end block further has left and right side walls 66 and 67. As best seen by reference in FIG. 2, the main body 61 is substantially cubical in shape. Further, its dimensions permit it to be slidably, and telescopingly received within the channel 50 which is defined by the rear wall 15 and the left and right side walls, 31 and 32, respectively. As best illustrated by reference to FIG. 3, a threaded channel 70 is formed in the bottom surface 65 and provides a convenient means whereby a threaded fastener or conduit may be received therein. The threaded channel is connected in fluid flowing relation with the object of interest by the threaded fastener or conduit. The threaded fastener or conduit will be discussed in greater detail, hereinafter. Further, a first passageway 71 is formed in the second end 63 and is disposed in fluid flowing relation relative to the threaded channel 70. The first passageway defines a radial extending seat 72 which is operable to accommodate, or otherwise receive and hold a seal 73 which is manufactured from a deformable, synthetic compound. The operation of the seal and the function of the first passageway will be discussed in greater detail hereinafter.

Figures 4, 4A, 7:
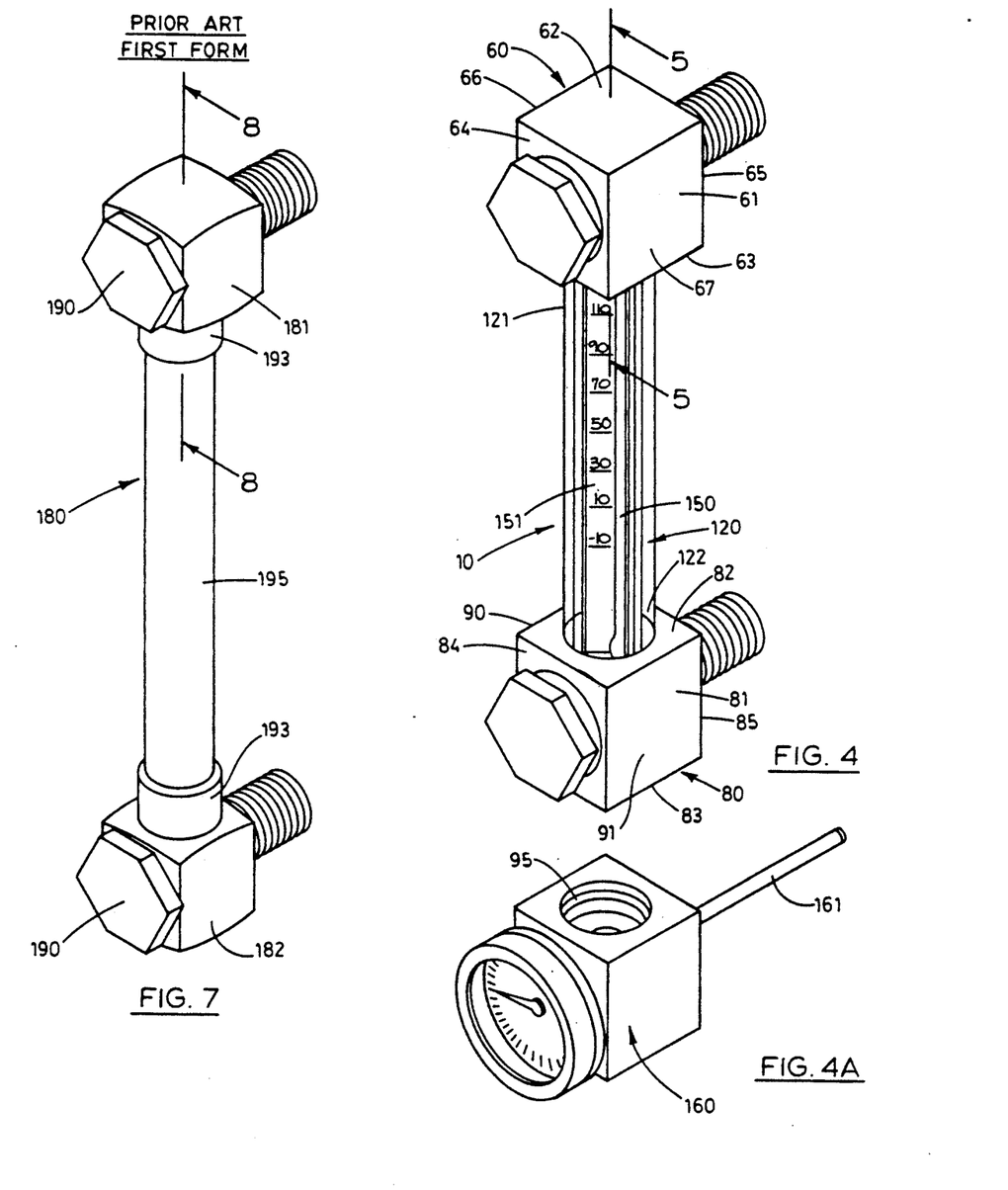
FIG. 4 is a perspective, fragmentary, environmental view of the apparatus of the subject invention, in an alternate form, and with some surfaces removed to show the structure below.
FIG. 4A is a perspective, fragmentary, environmental view of an analog thermometer which finds usefulness in the present invention.
FIG. 7 is a perspective, environmental view of the first form of the prior art.
Figure 5:
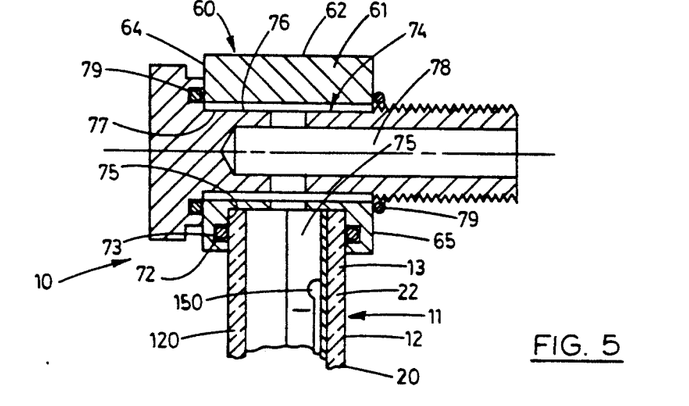
FIG. 5 is a fragmentary, vertical, side elevation view of the apparatus of the subject invention taken from a position of 5—5 in FIG. 4.
Figure 6:
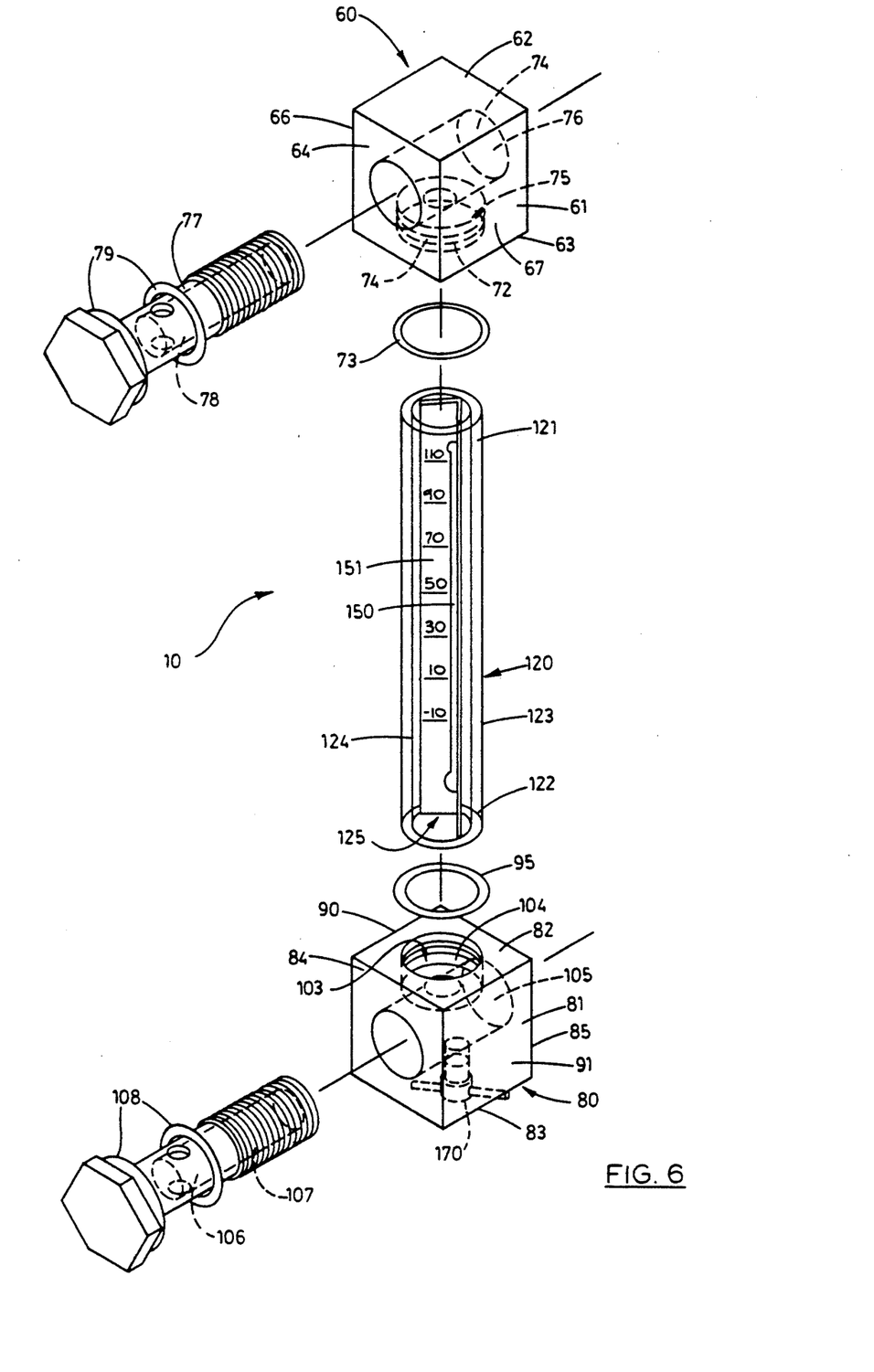
FIG. 6 is an exploded, perspective, environmental view of the apparatus of the subject invention shown in FIG. 4, with some supporting surfaces removed to show the structure, below.

An optional second form of the first end block 60 is shown in FIGS. 4, 5 and 6. As illustrated therein, the first end block includes a first passageway 74 which has a first portion or component 75 which operates in a fashion similar to that described with respect to 71. Further, the passageway 74 has a second portion or component 75 which is connected in fluid flowing relation therewith. The second portion 75 has a predetermined diametral dimension, and is operable to receive a fastener 77. The fastener has a fluid passageway 78 formed therein. Further, a pair of seals 79 are received about the fastener. As best illustrated in FIG. 5, the passageway 78 permits fluid to move from the apparatus 10 to the object of interest, not shown.

The apparatus 10 of the subject invention includes a second end block which is generally indicated by the numeral 80. The second end block includes a main body 81 having a first end 82; an opposite second end 83; a top surface 84; and an opposite bottom surface 85. Further, the main body includes left and right side walls, 90 and 91, respectively. A second passageway, which is generally indicated by the numeral 92, is formed in the main body 81. Generally speaking, the second passageway 92 is substantially identical to the first passageway 71 The second passageway includes a first portion 93 having a predetermined diametral dimension. Further, the first portion of the passageway includes a substantially radially extending seat 94 which is operable to receive or otherwise accommodate a seal 95, which is similar in characteristics to the seal 73 discussed, above. The second passageway also includes a second portion 100, which has a diametral dimension less than that of the first portion and which is substantially coaxially aligned therewith. The second passageway includes a third portion 101 which is disposed in fluid flowing relation relative to the second portion, and which is oriented in a substantially normal position relative thereto. The second passageway includes a fourth portion 102, which is substantially coaxial aligned with the third portion, and which further is defined by a plurality of threads which will accommodate a threaded fastener 106 or conduit. This particular fastener or conduit will be discussed in greater detail hereinafter. As best understood by reference to FIG. 2, the main body 81 has a substantially cubical shape, and exterior dimensions which are similar to the first end block 60. Similarly, the main body 81 is operable to be slidably received in the channel 50 and located adjacent the second end 14 of the support member 11.

An optional second form of the second end block 80 is best seen by reference to FIGS. 4 and 6. As was discussed above with respect to the alternate form of the first end block 60, the alternate form of the second end block has a second passageway 103 which includes a first portion or component 104; and a second portion or component 105 which is connected in fluid flowing relation therewith. The second portion has a predetermined diametral dimension, and is operable to receive a fastener 106. The fastener has a fluid passageway 107 formed therein, and a pair of seals 108 are received about the fastener. The alternative form of the second end block operates in a manner similar to the first end block and therefore is not discussed in further detail herein.

Figure 2:
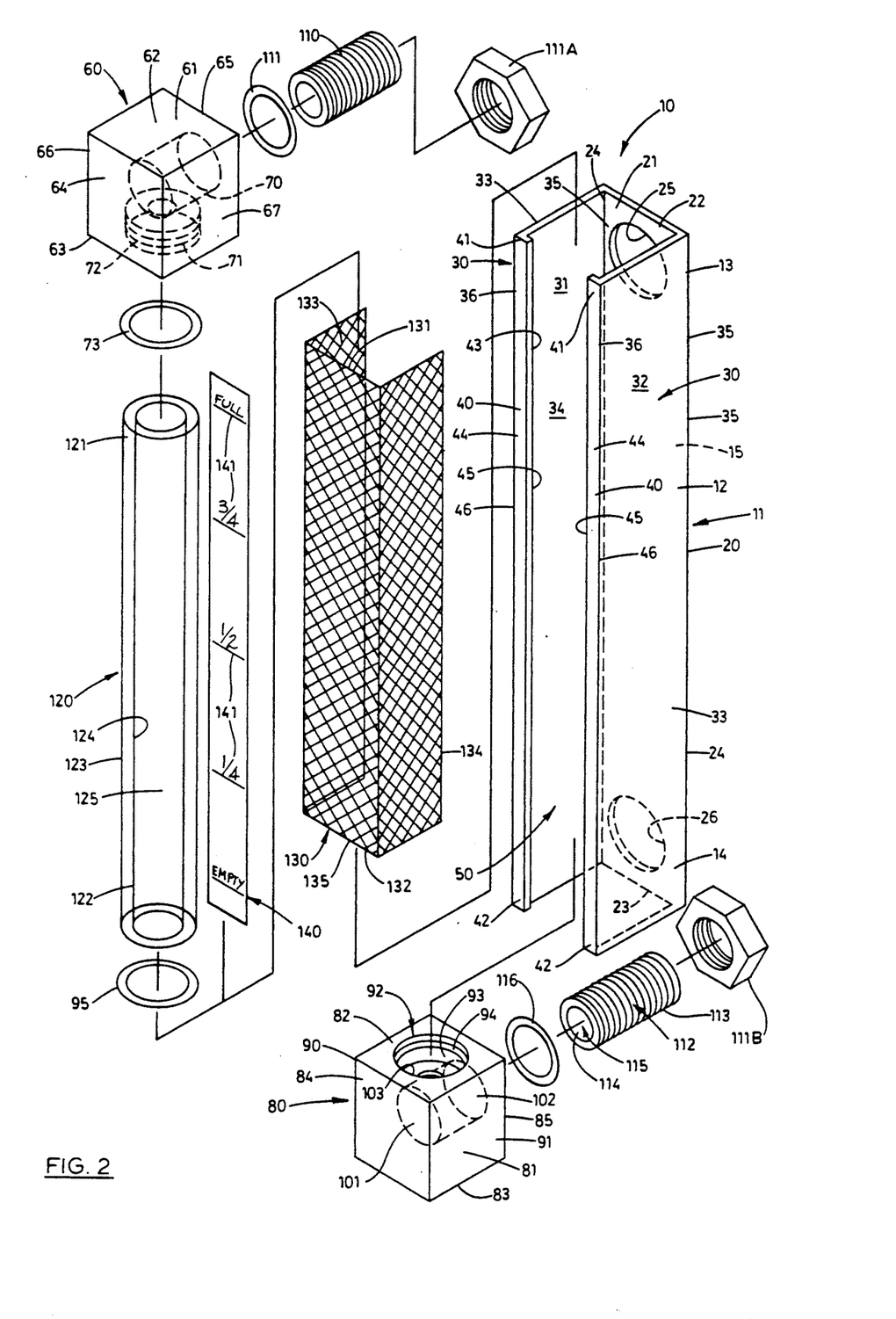
FIG. 2 is an exploded perspective view of the fluid level detection apparatus of the present invention.
Figure 3:
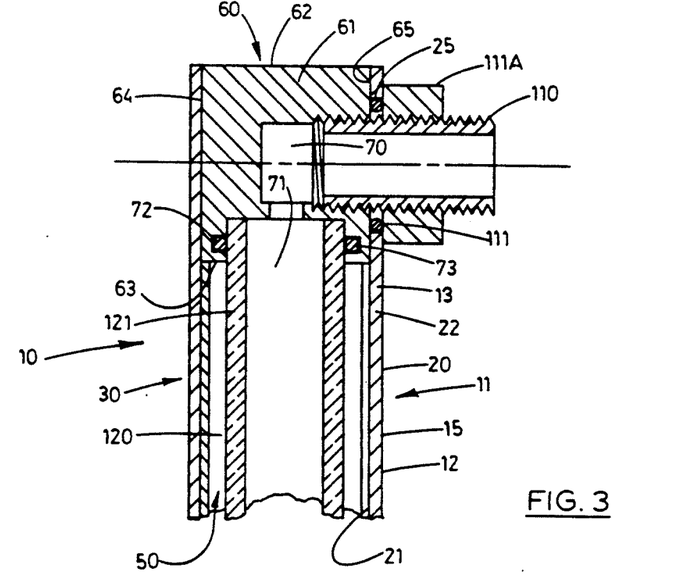
FIG. 3 is a fragmentary, vertical, sectional view taken from a position along line 3—3 of FIG. 1.

As best illustrated in FIG. 2, a threaded conduit, and which is generally indicated by the numeral 110, is dimensioned to threadably engage the threaded channel 70 which is formed in the first end block 60. The conduit is also received through the first aperture 25 thereby securing the first end block in an appropriate location on the support member 11. Further, a seal 111 is operable to be received about the threaded fastener and thereby provides a fluid tight seal. The conduit 110 is operable to fix the support member to an underlying supporting surface, not shown, such as a tank or structure by means of a suitably dimensioned nut 111A As noted above, the threaded conduit is disposed in fluid flowing relation with the object of interest. The apparatus 10 also includes a threaded conduit which is generally indicated by the numeral 112, and which has a threaded, exterior facing surface 113 and an opposite, interior facing surface 114, which defines a channel 115. As best seen by reference to FIG. 2, a seal is received about the threaded conduit 112 thereby providing a means for sealing the support member to an underlying supporting surface, which is not shown. As can be readily understood by a review of the drawings, the channel 115 connects the second end block 80 in fluid flowing relation with a source of fluid, which is not shown, but which enters in through the threaded conduit.

A transparent tube 120, which defines a conduit, is manufactured from various substrates such as glass, polycarbonate, and other synthetic materials. It should be understood that the transparent tube is essentially cylindrical in shape although it is conceivable that other conduit shapes could conceivably be used in some particular industrial applications. The transparent tube has opposite first and second ends, 121 and 122, respectively, an exterior facing surface 123; and an opposite interior facing surface 124, which defines a fluid passageway, chamber, or void 125. The transparent tube has an outside diametral dimension which is slightly greater than the inside diametral dimensions of the seals 73 and 95, respectively. As best appreciated by the study of FIG. 3, the individual seals, 73 and 95 partially occlude the first and second passageways 78 and 95. When the first and second ends of the tube are individually inserted in the first and second passageways, however, each end of the tube causes the individual seals to become compressed or otherwise deformed thereby sealing each end of the tube in fluid flowing relation with the respective passageways. The formation of a seal about the exterior facing surface of the tube is preferred for substrates such as glass. Further, such seals appear to be superior to compression seals which act on the opposite ends of the tube. This is best illustrated by reference to FIGS. 10, 11 and 13 which show the construction of several prior art devices. These prior art assemblies will be discussed in greater detail hereinafter.

An optional guard is provided, and which substantially impedes damage to the transparent tube 120. The guard, which is manufactured from a rigid, yet deformable substrate, may be fabricated from metal or other synthetic or polymeric materials. The guard is formed into a web, or screen, and thereafter molded or manufactured into a substantially u-shaped member which is generally indicated by the numeral 130. As best appreciated by a study of FIG. 1, the guard has a length dimension which is less than the distance between the first and second end blocks, 60 and 80, respectively, when they are appropriately positioned adjacent the opposite ends of the support member 11; a width dimension less than the distance between the left and right side walls 31 and 32; and a height dimension less than the distance between the rear wall 15 and the retaining lip 40. The guard has a first end 131; a second end 132; a first side wall 133; and an opposite second side wall 134. The guard has a top surface 135 which joins the first and second side walls together. As best understood by study of FIG. 2, the guard protects the transparent tube, but permits an operator to view the transparent tube which is positioned immediately behind it.

The apparatus 10 of the subject invention may include several additional elements which will provide enhanced operational characteristics for the present device. For example, and as best seen in FIG. 2, a background measurement guide, or insert 140 may be placed in rested relation on the interior facing surface 21 of the rear wall 15. The guide or insert 140 may include a pressure sensitive adhesive backing which causes the insert to adhere to the rear wall. The insert may also be printed with indicia 141 which indicates the amount of fluid in the accompanying object of interest which is being monitored. Alternatively, the insert may be printed with other indicia such as a customers trademark or other advertising logo. The insert is dimensioned such that it may be received in the channel 50, and disposed in rested relation on the rear wall, and between the left and right side walls 31, and 32, respectively. Further and as best seen in FIG. 4 and 6, an additional optional element may include a thermometer which is indicated by the numeral 150, and which is mounted on a supporting substrate 151 which is printed with a typical fahrenheit or centigrade scale, and perhaps both. The thermometer and associated supporting substrate are suitably dimensioned to be slidably, and telescopingly received in the fluid passageway or chamber 125 which is defined by the transparent tube or conduit 120. The thermometer, of course, measures the temperature of the fluid which is received in the passageway. In place of the thermometer, above, an optional temperature measuring device such as an analog temperature gauge 160 is provided and which is shown in FIG. 4A. It should be understood that the analog temperature gauge 160 is of conventional design and has a temperature probe 161 As will be appreciated, the second end block 80, would be modified to accommodate the analog temperature gauge. In particular, an additional conduit, not shown, would be formed in the top surface 84 and which would permit the temperature probe to be inserted into temperature sensing relation relative to the fluid being monitored. Further, a seal, not shown, would be provided and which would fluid sealingly secure the analog temperature gauge to the second end block. A further optional element may include a valve 170 which may be made integral with the second end block 80. As best seen in FIG. 6, the valve is mounted on the second end 83 of the second end block 80 and provides a convenient means for impeding fluid from entering the transparent tube 120. This valve is useful when an associated tank or assembly, not shown, is being cleaned, or in some particular industrial application.

PRIOR ART

The previous prior art, which was discussed earlier in this application, is best seen by reference to FIGS. 7, 8, 9, 10, 11, 12 and 13 respectively. As illustrated therein, several prior art fluid level detection devices are shown in exploded views thereby providing the details of their construction.

FIRST FORM

Figure 8:
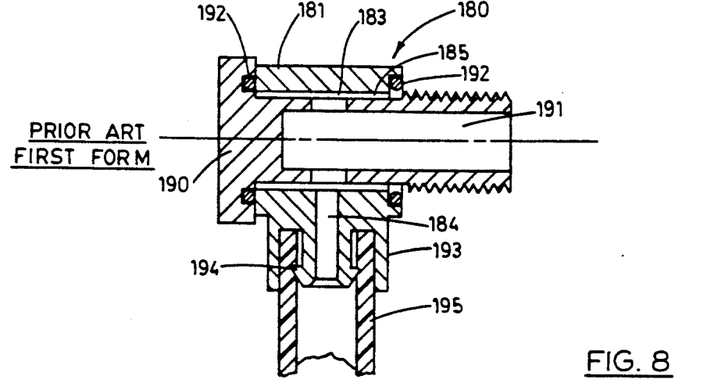
FIG. 8 is a fragmentary, vertical, side elevation view of the apparatus of the prior art taken from a position along line 8—8 of FIG. 7.

To fully appreciate the novelty of the present invention 10, it is helpful to study the previous prior art practices and devices which have been utilized to solve the same or similar problems. In this regard, the first form of the prior art fluid level detection devices is generally indicated by the numeral 180 in FIG. 7. As shown therein, the device includes first and second end blocks which are generally indicated by the numeral 181 and 182, respectively. Each of the end blocks are substantially identical, and they are best understood by a study of FIG. 8. As shown therein, the respective first and second end blocks have a passageway 183 which includes a first component 184, and a second component 185 which is disposed in fluid flowing relation therewith. The second component 185 has a predetermined diametral dimension which is operable to accommodate or otherwise receive a fastener 190. The fastener has a centrally disposed fluid flowing passageway 191 formed therein. Further, a pair of seals 192 are received about the fastener and are operable to seal the device to an object of interest. As best understood by a study of FIGS. 7 and 8, the respective end blocks also have a circumscribing end wall 193. The respective end blocks each include a nipple 194 which is disposed substantially centrally of the end wall 193. Additionally, a transparent tube 195 is operable to be received and otherwise secured between the nipple and the circumscribing wall. This is best depicted in FIG. 8.

It should be understood that while this prior art device operates with some degree of success, it has several readily identifiable shortcomings. The first immediate shortcoming is the complexity of its design. For example, the end blocks utilized with the present device, 181 and 182, while substantially identical, must be molded, or otherwise machined with a high degree of precision in order to provide a device which will effectively seal to a corresponding transparent tube. Additionally, sealing is achieved by either a deformation of the transparent tube or the end blocks thereby limiting the number of substrates that might be utilized with this same device. As a general matter, the device depicted in FIG. 7 is quite costly to manufacture in relative comparison to the device of the present invention which requires no precision machining.

SECOND FORM

Figure 10:
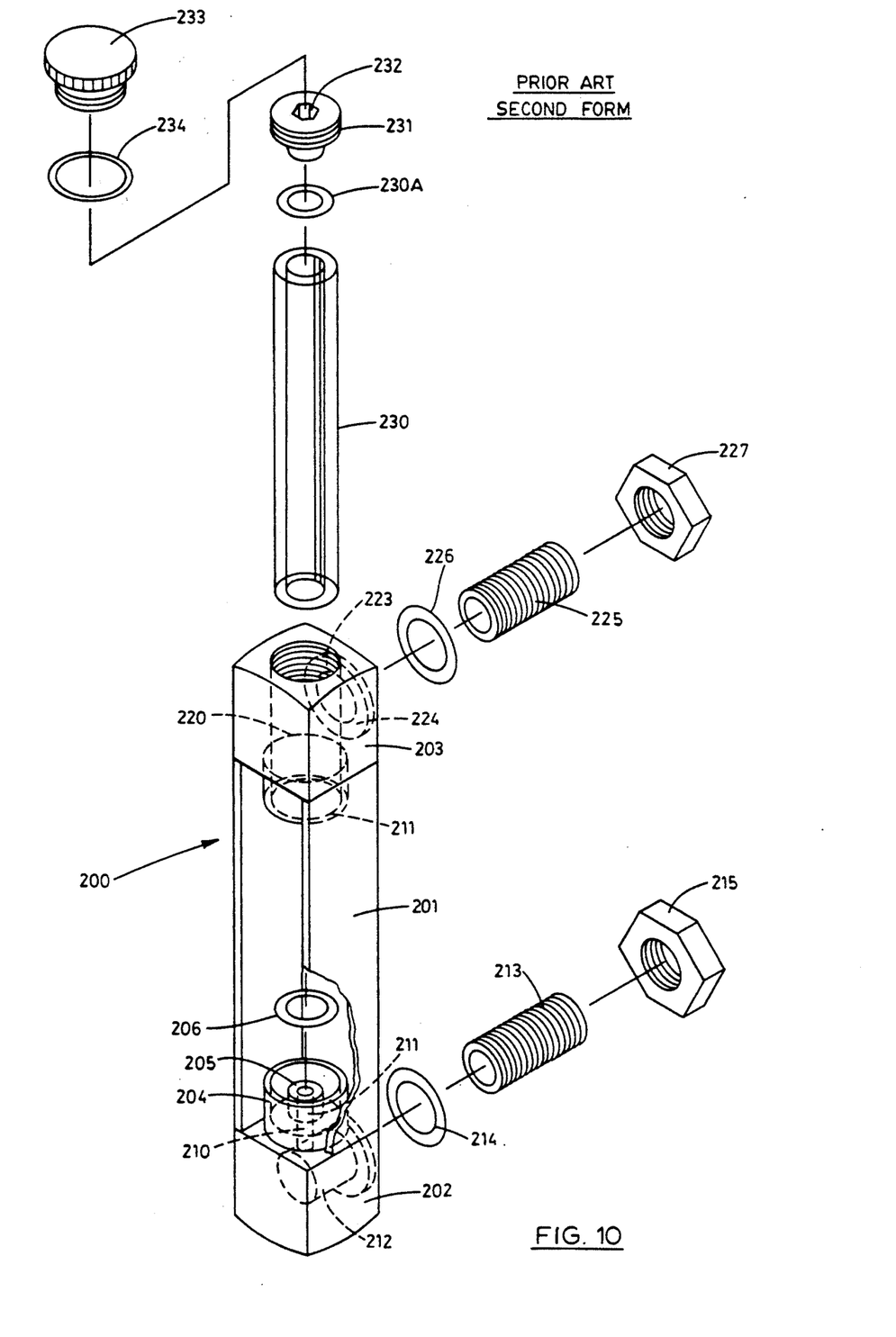
FIG. 10 is a perspective, exploded view of the second form of the prior art.

The second form of the prior art is best seen by reference to FIG. 10. As illustrated in this exploded view, the second form of the prior art is quite complex, relatively speaking, in comparison to the present invention. Consequently, the cost of manufacturing same is unduly burdensome. Additionally, it will be recognized that due to the complexity of the device, and also in view of the use of endwardly disposed compression seals, the present prior art device may have a propensity for developing leaks. As best seen in FIG. 10, the second form of the prior art, and which is generally indicated by the numeral 200, includes a support member 201. The support member has opposite first and second ends 202 and 203, respectively. The first end 202 has a circumscribing wall 204 which extends upwardly therefrom. Positioned substantially centrally of the circumscribing wall is a nipple 205. A compression seal 206 is received in the space between the nipple and the circumscribing wall and is forcibly engaged by the transparent tube which will be discussed hereinafter. The first end 202 defines a fluid passageway 210 which has a first component 211, and a second component 212 which is disposed in fluid flowing relation with the object of interest. The second component 212 further is operable to be engaged by a threaded conduit 213. A seal 214 is received about the threaded conduit. A nut 215 is operable to threadably engage the threaded conduit and secure it to the object of interest. A channel 220 is formed in the second end 203. The channel has a first end 221, and an opposite second end 222. A plurality of threads 223 define the second end of the channel. Additionally, a threaded channel 224 is formed in the second end, and is operable to threadably engage a threaded conduit 225. A seal 226 is received about the threaded conduit 225, and a nut 227 is operable to threadably engage the threaded conduit thereby securing it to the object of interest. A transparent tube 230 is slidably received in telescoping relation in the channel 220 and is received in fitted fluid sealing relation between the circumscribing wall 204 and the nipple 205. The transparent tube 230 is urged downwardly and into sealing engagement with the seal 206 by means of the first threaded fastener 231 which threadably engages the threads 223. The first threaded fastener has an aperture 232 formed substantially centrally thereof and which further may be engaged by a suitably dimensioned allen wrench not shown. A seal 230A is sandwiched between the first threaded fastener and the end of the transparent tube. A threaded cap 233 is operable to threadably engage the channel 220, and a seal 234 prevents fluid leakage therefrom.

THIRD FORM

Figure 11:
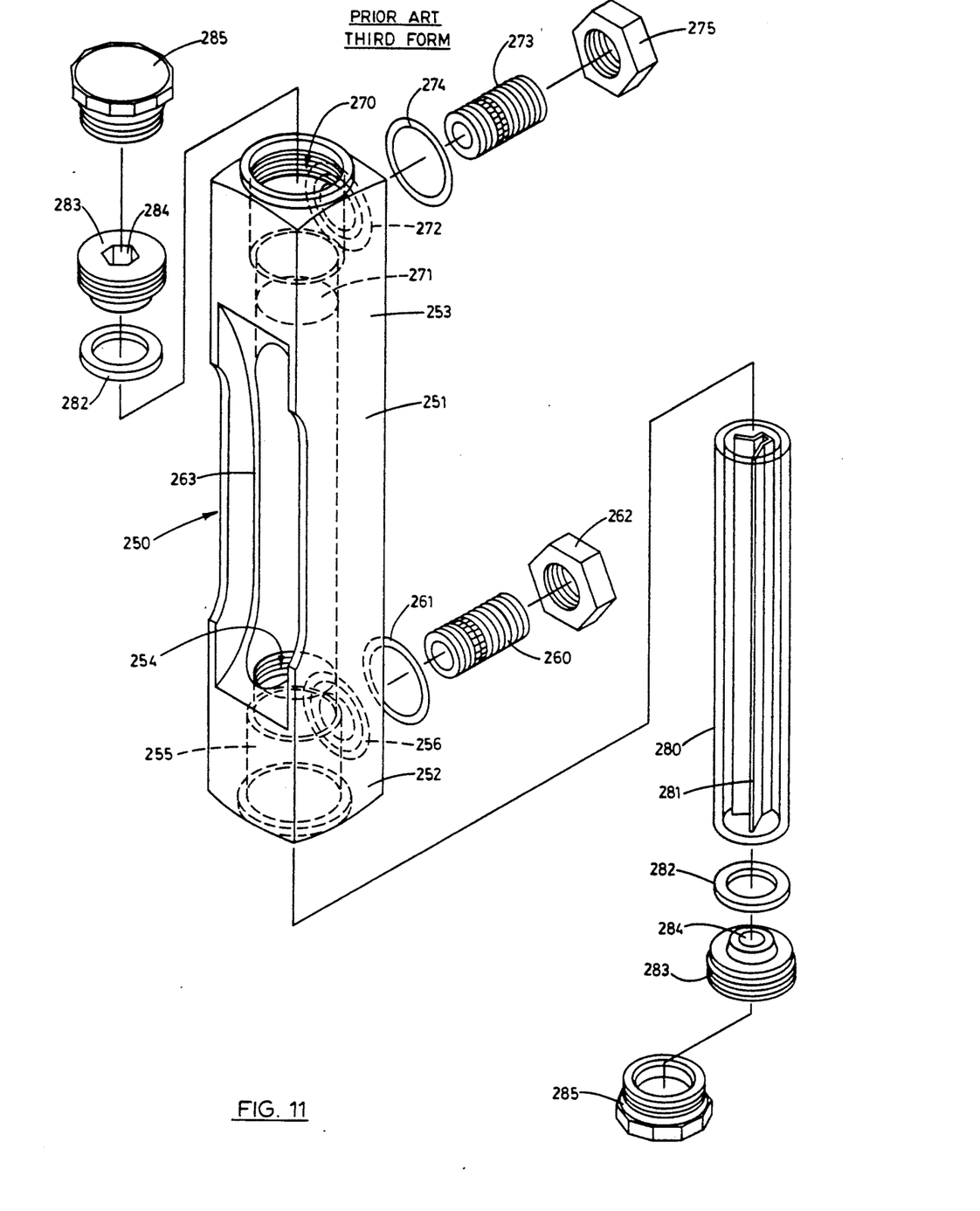
FIG. 11 is a perspective, exploded view of the third form of the prior art.

The third form of the prior art is indicated generally by the numeral 250 in FIG. 11. As will be appreciated by a study of FIG. 11, this particular device is quite complex, generally speaking, and requires many manufacturing steps thereby making it quite costly to fabricate and incapable of being readily retrofitted to machines having various operational characteristics. As best seen in FIG. 11, the third form of the prior art 250 has a support member 251 which has opposite first and second ends 252 and 253, respectively. A passageway 254 is formed in the first end and includes a first component 255, and a second component 256 which is disposed in fluid flowing relation therewith. A threaded conduit 260 is operable to threadably engage the second component 256 of the passageway. A seal 261 is received about the threaded conduit. Additionally, a nut 262 is provided, and which threadably engages the threaded conduit thereby securing it to the object of interest. As will be seen, an aperture 263 is machined out of the support member thereby providing a means by which an operator may view the transparent tube. The transparent tube will be discussed in greater detail hereinafter. A passageway 270 is formed in the second end 253 of the support member. The passageway which is substantially coaxially aligned with the passageway 254 has a first component 271, and a second component 272 which is disposed in fluid flowing relation therewith. A threaded conduit 273 is operable to threadably engage the second component 272. Further, a seal 274 is received about the threaded conduit. Finally, a nut, 275, is operable to threadably engage the threaded conduit 273 thereby securing it to the object of interest. A transparent tube 280 is telescopingly received in the coaxial aligned passageways 254 and 270, respectively. The transparent tube as depicted in FIG. 11 includes a thermometer 281 which is telescopingly received therein. A pair of seals 282 are respectively placed endwardly of the transparent tube, and are thereafter secured in place by a pair of threaded fasteners 283 which individually threadably engage each of the passageways 254 and 270, respectively. Each of the threaded fasteners has a centrally disposed aperture 284 which provides fluid flow communication with the source of fluid and which further may be engaged by an allen wrench or other suitable tool. A pair of threaded caps are individually operable to engage the respective passageways thereby sealing each end of the apparatus.

FOURTH FORM

Figure 12:
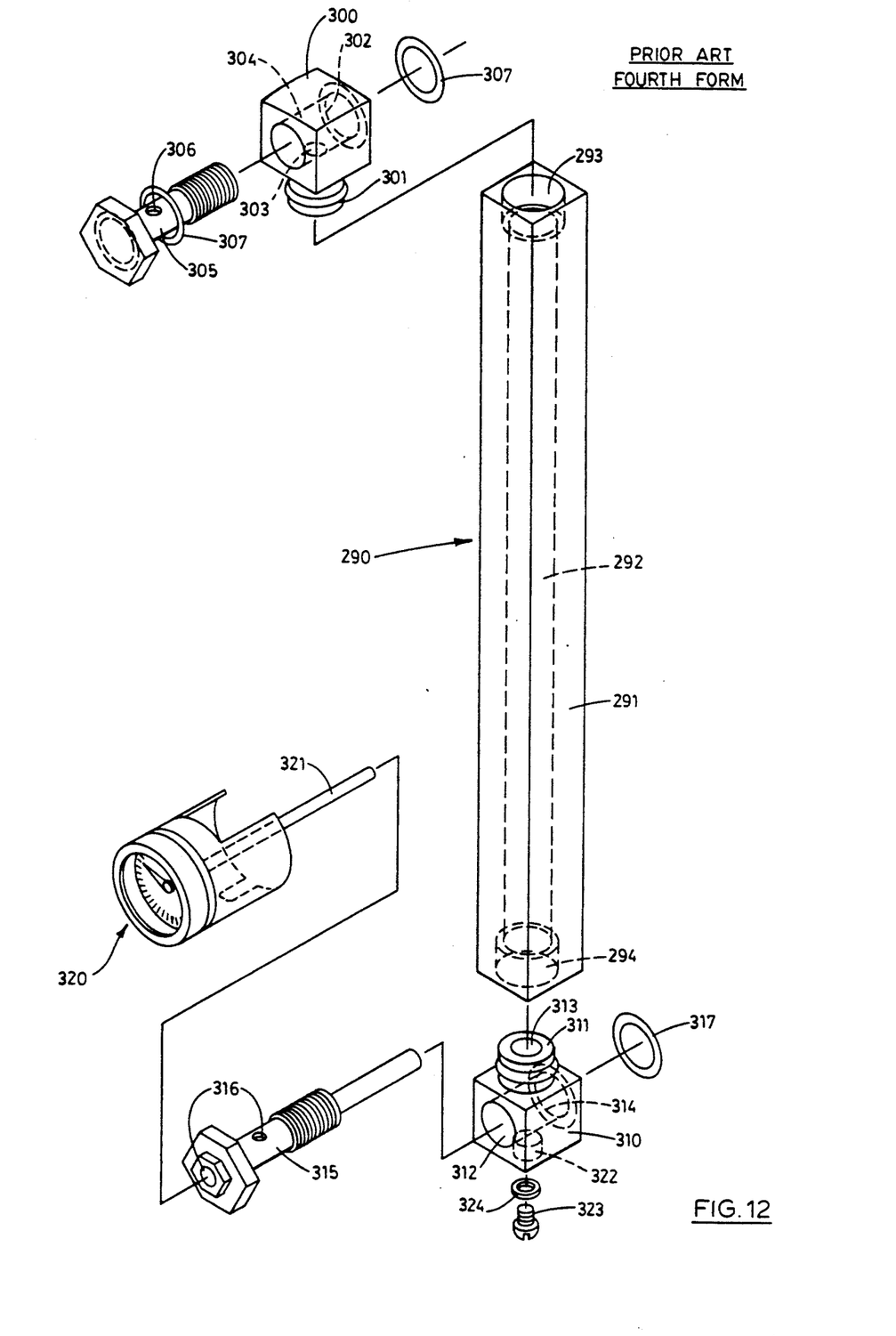
FIG. 12 is a perspective, exploded view of the fourth form of the prior art.

The fourth form of the prior art is generally indicated by the numeral 290 in FIG. 12. As shown therein, the apparatus includes a substantially transparent and rectangularly shaped tube 291 which is manufactured from a synthetic polymeric-based compound which has high strength. This device would not be suitable for use in certain applications, such as where the transparent tube would come into contact with highly caustic materials. Therefore, the range of possible uses of this device is limited, relatively speaking. As shown herein, the transparent tube is substantially rectangularly shaped and has a thick wall. The transparent tube defines a fluid passageway 292. Further, first and second seats 293 and 294 are formed in the opposite ends thereof. The fourth form of the prior art has a first end block 300. The end block includes a nipple 301 which may be received in fluid sealing relation in the first seat. The first end block further defines a passageway which has a first component 303 and a second component 304 which is disposed in fluid flowing relation therewith. A fastener 305 is received in the second component 304, and is operable to threadably engage the object of interest, not shown. The fastener has a fluid passageway 306 formed therein. A pair of seals 307 are received about the fastener 305. The fourth form of the prior art further has a second end block and which is generally indicated by the numeral 310. The second end block also includes a nipple 311 which is operable to be sealingly secured or otherwise received in the second seat 294. The second end block similarly has a passageway 312 formed therein, and which is defined by first and second components 313 and 314, respectively. A fastener 315 is operable to be received in the second component of the passageway and threadably engage the object of interest. Further, a passageway 316 is formed in the fastener and which extends along the entire length of the fastener and to the exterior surface thereof. A seal 317 is received about the fastener. The fastener is operable to receive an analog thermometer 320 which is of conventional design. The thermometer has a temperature probe 321 which is telescopingly received in the passageway 316. Additionally, this form of the prior art includes a drain 322 which is operable to be threadably engaged by a fastener 323. A seal 324 is received about the fastener 323.

FIFTH FORM

Figure 13:
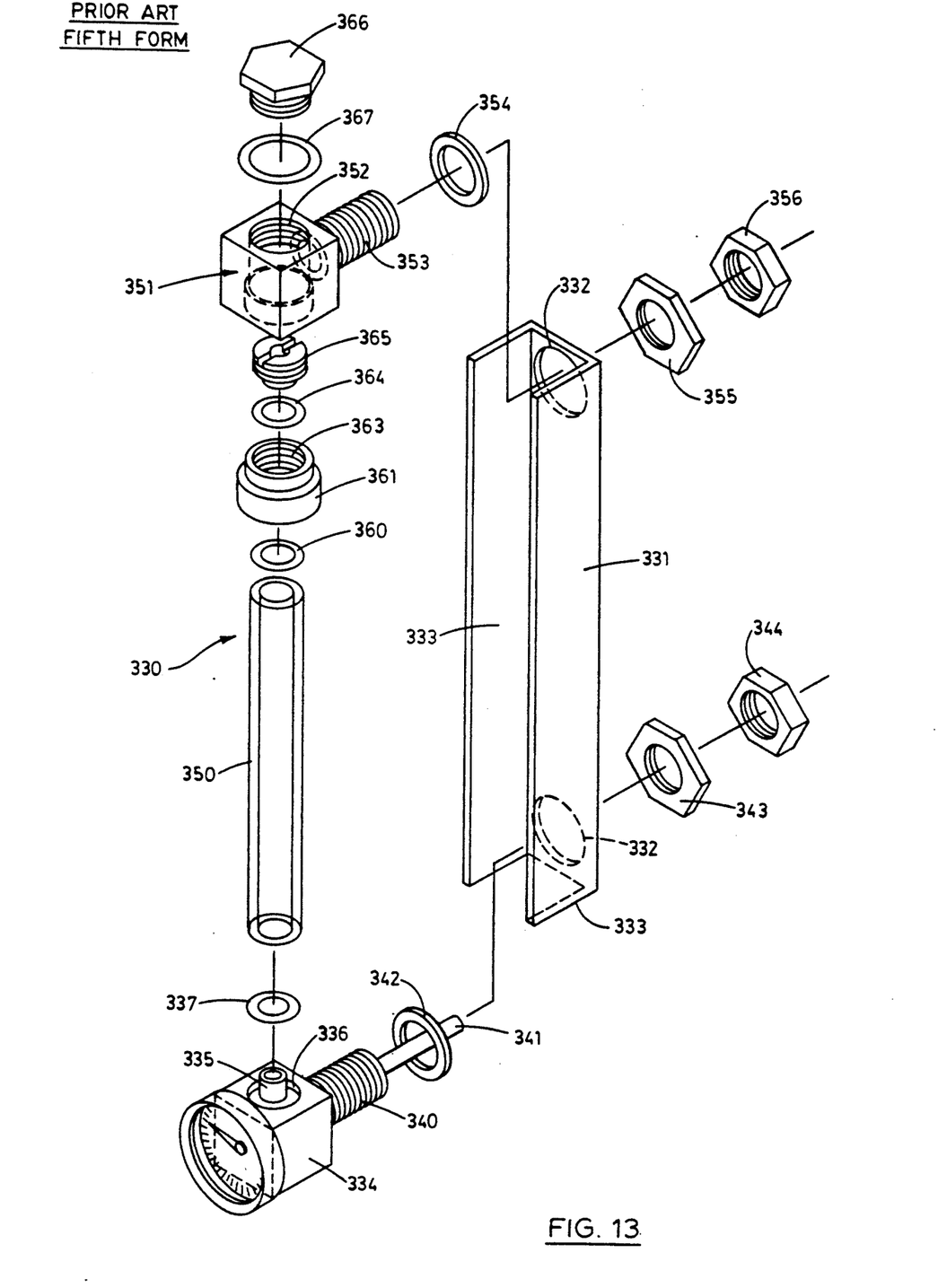
FIG. 13 is a perspective, exploded view of the fifth form of the prior art.

The fifth form of the prior art is generally indicated by the numeral 330 in FIG. 13. As shown therein, this prior art device includes a support member 331. A pair of apertures 332 are formed in the opposite ends of the support member. Further, the support member includes substantially vertical side walls 333. A thermometer of conventional design is generally indicated by the numeral 334. The thermometer is made integral with an end block. The end block includes a nipple 335 which extends substantially normally upwardly therefrom. Further, a substantially circular seat 336 surrounds the nipple. A seal 337 is received in the seat. As best seen in FIG. 13, a threaded conduit 340 is mounted on the thermometer and extends normally outwardly relative thereto. Further, a temperature probe 341 is disposed substantially centrally of the threaded conduit and is operable to be disposed in temperature sensing relation relative to the fluid being monitored. A seal 342 is received about the threaded shaft, and a first nut 343 is operable to secure the thermometer on the support member 331. Further, a second nut 334 is operable to secure the fifth form of the prior art device 330 on the object of interest. A transparent tube 350 is provided. The transparent tube may be manufactured from glass, polymers or other suitable synthetic materials. The device 330 further includes an end block 351 which defines a passageway 352. A threaded conduit 353 is affixed o the end block and is disposed in fluid flowing relation therewith. A seal 354 is received about the threaded conduit 353, and a first nut 355 is operable to secure the end block on the support member 331. A second nut 356 is provided and is operable to secure the fifth form of the prior art device to the object of interest, not shown. A suitable seal 360 is borne endwardly of the transparent tube and a seal holding assembly 361 is operable to secure or position the seal 360 in fluid sealing relation relative to the tube 350. The seal holding assembly includes a threaded passageway 363. A seal 364 is borne endwardly of the seal holding assembly and is further held in place by a threaded fastener 365 which has an aperture formed therein. The seal holding assembly 361 is held in place by the end block 351 once it is secured in an appropriate location on the support member 331 by the nuts 343 and 355 described, above. A threaded cap 366 is operable to engage the end block, and a seal 367 is received about the threaded cap. As will be appreciated by a study of FIG. 13, the fifth form of the prior art is quite complex, relatively speaking, and expensive to manufacture in comparison to the present invention 10.

OPERATION

The operation of the described embodiment of the present invention is believed to be readily apparent and is briefly summarized at this point. As best seen by reference to FIG. 2, the fluid level detection apparatus 10 includes a support member 11 having a rear wall 15, and a pair of side walls 31 and 32 which extend outwardly therefrom. The support member further has opposite first and second ends 13 and 14, and the side walls and rear wall define a channel 50 having predetermined height, width and length dimensions. A first end block 60 having a main body 61 is dimensioned to be slidably received in the channel 50 and positioned adjacent the first end 13 of the support member 11. The first end block defines a first passageway 71 which is formed therein and which has predetermined dimensions. A seal 73 is borne by the first end block and positioned in the first passageway.

A second end block 80 having a main body 81 is dimensioned to be slidably received in the channel 50 and positioned adjacent the second end 14 of the support member 11. The second end block defines a second passageway 92, which has predetermined dimensions, and which is disposed in fluid flowing relation with a source of fluid, not shown. A seal 95 is borne by the second end block and disposed in the second passageway. A transparent tube, or conduit which is generally indicated by the numeral 120, defines a chamber 125. The transparent tube has opposite ends 121 and 122. The opposite ends of the tube are slidably and telescopingly received in the first and second passageways 71 and 92, respectively. The respective seals 73 and 95 engage the transparent tube thereby securing the tube in fluid flowing relation relative to the source of fluid.

The apparatus 10 has various optional components, which include a thermometer 15? and 160; a valve 170; and a guard 130, which protects the transparent tube 120 in certain environments. These components may be present in any number of combinations.

It should be understood that the present apparatus 10 also may be configured as a kit which may be assembled at a remote location for detecting the fluid level of an object of interest. In the present apparatus, a fluid level detection kit would include the support member 11, the first and second end blocks 60 and 80, respectively, and the transparent tube 120. To utilize the kit, it should be understood that the support member 11 is formed to a desired length at the work site or remote location. Further, and after the support member is formed to the desired length, apertures such as what is shown in FIG. 2, and which are indicated by the numerals 25 and 26, are formed in the opposite ends. The first and second end blocks, 60 and 80, respectively, are thereafter slidably received in the channel 50, and located adjacent to the opposite ends of the support member. When this occurs, the individual blocks are aligned or otherwise disposed in substantial registry with the respective apertures. The threaded conduits 110 and 120 would then individually threadably engage the threaded channel 70, and the fourth portion 102 of the second passageway 92, thereby releasably fixing the first and second end blocks in appropriate locations. Prior to attaching the end blocks, however, a transparent tube 120 is cut to a predetermined length such that it extends between the first and second end blocks once they are located in their predetermined positions. The transparent tube 120 is telescopingly and slidably received in the first and second passageways defined by the first and second end blocks, and the respective end blocks are fastened in their respective, predetermined positions adjacent the opposite ends of the support member. As earlier discussed, the seals 73 and 95 are compressed into sealing engagement about the exterior surface 123 of the transparent tube thereby sealing the tube in fluid flowing relationship with the source of fluid, which is not shown.

Therefore, it will be seen that the present invention has utility when it is employed as a kit which may be assembled at a remote location to form a fluid level detection apparatus which detects the fluid level in an object of interest. Furthermore, the fluid level detection apparatus of the present invention provides a fully dependable and practical means for detecting the fluid level in an object of interest while reducing to an absolute minimum the possibility of malfunction. The present invention is easily manufactured and otherwise accessed for maintenance, modification and the like, and is further of sturdy and durable construction and is relatively simple to install or retrofit on existing machines or other devices.

Although the invention has been herein shown and described what is conceived to be the most practical and preferred embodiment, it is recognized that departures may be made therefrom within the scope of the invention which is not to be limited to the illustrated details disclosed.

Having described my new invention, what I claim is new and desire to secure by letters patent of the United States is:

1. A fluid level detection apparatus comprising:

a support member having a rear wall and a pair of side walls which extend outwardly therefrom, and wherein the support member has opposite first and second ends, and wherein the side walls and rear wall define a channel having predetermined length, width, and height dimensions, at least one of the walls having first and second apertures formed therethrough, the apertures being spaced a predetermined distance apart;

a first end block having a main body which is dimensioned to be slidably received in the channel, and positioned adjacent the first end of the support member, the first end block having a first passageway formed therein, and wherein a seal is borne by the first end block and positioned in the passageway;

a second end block having a main body which is dimensioned to be slidably received in the channel and positioned adjacent the second end of the support member, the second end block having a second passageway formed therein, and wherein the second passageway is disposed in fluid flowing relation with a source of fluid, and wherein a seal is borne by the second end block and disposed in the second passageway, the first end block passageway disposed in registry with said first aperture and the second end block passageway disposed in registry with said second aperture, the apertures positioning the first and second end blocks a predetermined distance apart; and a transparent tube defining a conduit and having opposite ends, and wherein the tube is slidably and telescopingly receive din the passageways defined by the first and second end blocks, and wherein the respective seals engage the transparent tube thereby securing the tube in fluid flowing relation relative to the source of fluid.

2. A fluid level detection apparatus comprising:

a support member having a rear wall and a pair of side walls which extend outwardly therefrom, and wherein the support member has opposite first and second ends, and wherein the side walls and rear wall define a channel having predetermined length, width, and height dimensions, wherein the rear wall of the support member defines a pair of substantially longitudinally oriented peripheral edges, and wherein the respective side walls are mounted along each of peripheral edges and extend outwardly therefrom, and wherein each of the side walls has a retaining lip, and wherein the respective retaining lips extend inwardly relative to each of the side walls;

a first end block having a main body which is dimensioned to be slidably received in the channel, and positioned adjacent the first end of the support member, the first end block having a first passageway formed therein, and wherein a seal is borne by the first end block and positioned in the passageway;

a second end block having a main body which is dimensioned to be slidably received in the channel and positioned adjacent the second end of the support member, the second end block having a second passageway formed therein, and wherein the second passageway is disposed in fluid flowing relation with a source of fluid, and wherein a seal is borne by the second end block and disposed in the second passageway, and wherein the respective end blocks are retained in the channel by the individual retaining lips; and a transparent tube defining a conduit and having opposite ends, and wherein the tube is slidably and telescopingly received in the passageways defined by the first and second end blocks, and wherein the respective seals engage the transparent tube thereby securing the tube in fluid flowing relation relative to the source of fluid.

3. An apparatus as claimed in claim 2, and wherein the tube has an exterior facing surface, and the respective seals are disposed in sealing relation about the exterior facing surface of each end of the tube.

4. An apparatus as claimed in claim 3, and wherein means are provided for securing the respective end blocks on the first and second ends of the support member.

5. An apparatus as claimed in claim 4, and wherein the apparatus further includes a guard which is borne by the support member and which is operable to protect the transparent tube.

6. An apparatus as claimed in claim 5, and wherein a thermometer is telescopingly received in the transparent tube.

7. An apparatus as claimed in claim 4, and wherein a thermometer is borne by the second end block and is operable to measure the temperature of the fluid in the transparent tube.

8. A fluid level detection kit which may be assembled at ar emote location for detecting the fluid level in an object of interest, the kit comprising:

a support member having opposite ends, and including side and rear walls which define a channel, and wherein the support member is formed to a predetermined length and includes two spaced apart apertures through one of the walls;

a first end block having a passageway formed therein, and wherein a seal is borne by the first end block and disposed in the passageway, and wherein the first end block is slidably received in the channel and located adjacent the first end of the support member;

a transparent tube defining a passageway, and having opposite ends, and wherein the tube is formed to a length less than the length of the support member, and wherein one end of the tube is telescopingly received in the passageway formed in the first end block, and wherein the seal engages the transparent tube; and a second end block having a passageway formed therein and which is disposed in fluid flowing relation relative to the object of interest, and wherein the opposite end of the tube is telescopingly received in the passageway defined by the second end block, and wherein a seal is borne by the second end block and is operable to seal the opposite end of the transparent tube in fluid flowing relation relative to the object of interest, the apertures being positioned in registry with the first and second end block passageways respectively, and positioning the first and second end blocks a predetermined distance apart.

9. A kit as claimed in claim 8, and wherein the tube has an exterior facing surface, and wherein each of the seals engage the exterior facing surface of the tube.

10. A kit as claimed in claim 9, and wherein the kit further includes a means for securing the individual end blocks in a fixed location on the support member.

11. A kit as claimed in claim 10, and wherein the kit further includes a guard which is borne by the support member, and which protects the transparent tube.

12. A fluid level detection apparatus comprising:

a support member having a main body which defines a channel and wherein the main body has at least one wall and opposite first and second ends, the at least one wall having first and second apertures formed therethrough, the apertures being spaced a predetermined distance apart;

a first end block slidably received in the channel and is posed adjacent the first end of the main body, the first end block defining a first passageway having predetermined dimensions, and wherein a first seal is borne by the first end block and disposed in the first passageway;

a second end block slidably received in the channel and disposed at the second end of the main body, the second end block defining a second passageway having predetermined dimensions and which is further disposed in fluid flowing relation relative to a source of fluid, and wherein a second seal is borne by the second end block and disposed in the second passageway, said first end block passageway disposed in registry with said first aperture and the second end block passageway disposed in registry with said second aperture, the apertures positioning the first and second end blocks a predetermined distance apart; and a tube having opposite ends and defining a conduit, and wherein the opposite ends of the tube are individually and telescopingly received in the first and second passageways, and the firs and second seals engage the exterior facing surface of the opposite end so the tube, and wherein the main body of the support member retains the respective first and second end blocks in the channel.

13. A fluid level detection apparatus comprising:

a support member having first and second opposed ends and a wall defining a channel of predetermined length, the wall having first and second spaced apart apertures formed therethrough, the first aperture being located toward the first end of the support member and the second aperture being located toward the second end of the support member;

a first end block having a main body which provides slidable engagement with the channel and having a first passageway formed therein, the first passageway in registry with the first aperture;

a second end block having a main body which provides slidable engagement with the channel and having a second passageway formed therein, the second passageway in registry with the second aperture, the apertures positioning the first and second end blocks a predetermined distance apart; and a transparent tube defining a conduit and having opposite ends, said tube providing slidable and telescopic engagement with the passageways formed in the first and second end blocks.

14. The fluid level detection apparatus of claim 13, further comprising a seal borne by the first end block and disposed in the first passageway and a second seal borne by the second end block and disposed in the second passageway, the respective seals engaging the transparent tube to secure the tube in fluid flowing relation relative to the source of fluid.

* * * * *

UNITED STATES PATENT AND TRADEMARK OFFICE
CERTIFICATE OF CORRECTION

PATENT NO. : 5,323,653
DATED : June 28, 1994
INVENTOR(S) : Donald Gruett

It is certified that error appears in the above-indentified patent and that said Letters Patent is hereby corrected as shown below:

Column 11, line 30, after the word "affixed" insert --on--.

Col 12, line 21 delete -- 15? -- and insert -- 150;

Col 13, line 51 delete -- receive din -- and insert -- received in --;

Col 14, line 49 delete -- ar emote -- and insert -- a remote --;

Col 15, line 8 delete -- firs -- and insert -- first --;

Col 15, line 10 delete -- end so -- and insert -- ends of --.

Signed and Sealed this

Twenty-seventh Day of September, 1994

Attest:

BRUCE LEHMAN

*Attesting Officer*   *Commissioner of Patents and Trademarks*